Nov. 5, 1940.   J. L. PETZ ET AL   2,220,491
TYPE SOLDERING AND ALIGNING MACHINE
Filed Jan. 14, 1938   4 Sheets-Sheet 1

FIG.1.

INVENTORS
JOHN L. PETZ
CHESTER W. CRUMRINE
RONALD D. DODGE
BY
*W. M. Nelson*
ATTORNEY Nov. 5, 1940.    J. L. PETZ ET AL    2,220,491
TYPE SOLDERING AND ALIGNING MACHINE
Filed Jan. 14, 1938    4 Sheets-Sheet 2

FIG.2.

INVENTORS
JOHN L. PETZ
CHESTER W. CRUMRINE
RONALD D. DODGE
BY
ATTORNEY

Nov. 5, 1940. J. L. PETZ ET AL 2,220,491

TYPE SOLDERING AND ALIGNING MACHINE

Filed Jan. 14, 1938 4 Sheets-Sheet 4

INVENTORS
JOHN L. PETZ
CHESTER W. CRUMRINE
RONALD D. DODGE

BY

ATTORNEY

Patented Nov. 5, 1940

2,220,491

UNITED STATES PATENT OFFICE 2,220,491

TYPE SOLDERING AND ALIGNING MACHINE

John L. Petz, Chester W. Crumrine, and Ronald D. Dodge, Rochester, N. Y., assignors to International Business Machines Corporation, New York, N. Y., a corporation of New York Application January 14, 1938, Serial No. 184,920

23 Claims. (Cl. 219—12)

This invention relates to improvements in means and methods for aligning type elements and securing them to type bars such as are commonly used in typewriting machines and other office machines.

The broad object of the invention is to provide a machine for soldering and aligning type bars.

An object is to provide a machine which greatly reduces the number of operations required to align and solder type elements on the type bars of typewriting machines.

Another object is to provide an improved method of aligning type bars for typewriting machines.

An object is to provide an improved method of soldering type elements to type bars.

An object is to provide a novel optical system for ascertaining when type elements are in proper alignment.

An object is to provide a machine which greatly reduces and simplifies the operation of aligning and/or soldering type elements to type bars.

An object is to provide a combined type aligning and type soldering machine which is very simple to operate and productive of very accurate alignment of the type bars.

An object is to provide a machine which combines the operations of aligning and soldering the types thereby effecting a considerable saving in time in the manufacture and assembly of type bars.

Further objects of the instant invention reside in any novel feature of construction or operation or novel combination of parts present in the embodiment of the invention described and shown in the accompanying drawings whether within or without the scope of the appended claims and irrespective of other specific statements as to the scope of the invention contained herein.

The type soldering mechanism is mounted upon a framework which consists of four legs 10 (Figs. 1 and 3) made of angle iron, braced at the sides by diagonal cross bars 11, and joined at top and bottom on three sides by shorter lengths of angle iron 12. Secured to the top and side angle members 12 is a base member 13 on which is secured, as by means of bolts 14, a base casting 15, the latter being provided with short rectangular legs 15a which rest upon the top surface of the member 13.

The base casting 15 is provided with an open slot 15b (Figs. 1 and 3) in which slot is mounted a frame 16 formed with upstanding lugs 16a at the ends. This frame is pivotally mounted at the ends of the slot 15b by means of studs 17 having conical points bearing in conical seats in the frame 16 whereby the upstanding lugs 16a of the frame 16 may be rocked in unison with a fore and aft motion in Fig. 1. The frame 15, at its right hand rear corner, is provided with an upstanding lug 15c housing a spring-operated plunger 18 which presses against the right hand upstanding arm 16a of frame 16 thereby forcing said arm against the end of a thumb screw 19 received in a threaded hole in another upstanding lug 15d formed in the casting 15. Thus, by rotating the thumb screw 19 in one direction or the other, the frame 16 may be adjustably rocked fore and aft.

Pivotally mounted on the lugs 16a of the frame 16 is a U-shaped frame 20 (Figs. 1 to 3) having conical seats cooperating with conically pointed studs 21 screwed into threaded holes in the lugs 16a. The two arms of the frame 20 extend substantially horizontally to points near the front edge of the casting 15. The left hand arm of the frame 20 rests on the upper end of a thumb screw 22 the lower end of which is screwed into a threaded hole in the top surface of casting 15 whereby rotation of said thumb screw causes the forward ends of frame 20 to be rocked up or down according to the direction in which the thumb screw is turned.

The arms of the frame 20 (Fig. 4) are formed with two bosses 20a which are in line horizontally. The left hand boss 20a houses a spring pressed plunger 23 which bears in a conical seat in an arcuate casting 24. The right hand boss 20a houses a conically pointed stud 25, the shank of which is loosely mounted in a hole in the boss 20a whereby the frame casting 24 is capable of rocking movement on the thumb screw 25 and the plunger 23. The stud 25 has a keyway cut in its right hand end with which loosely cooperates the end of stud 25a screwed into a threaded hole in the right hand boss 20a to permit the stud 25 to slide in its seat without turning. A thumb screw 25b is screwed into a threaded bore in the right hand boss 20a and the shank of the thumb screw 25b normally abuts the end of stud 25. The spring pressed plunger 23 always presses the stud 25 into engagement with the shank of the thumb screw 25b. It is clear that by rotating the thumb screw 25b the frame 24 may be moved longitudinally of the axes of the thumb screw and plunger.

Figure 2:
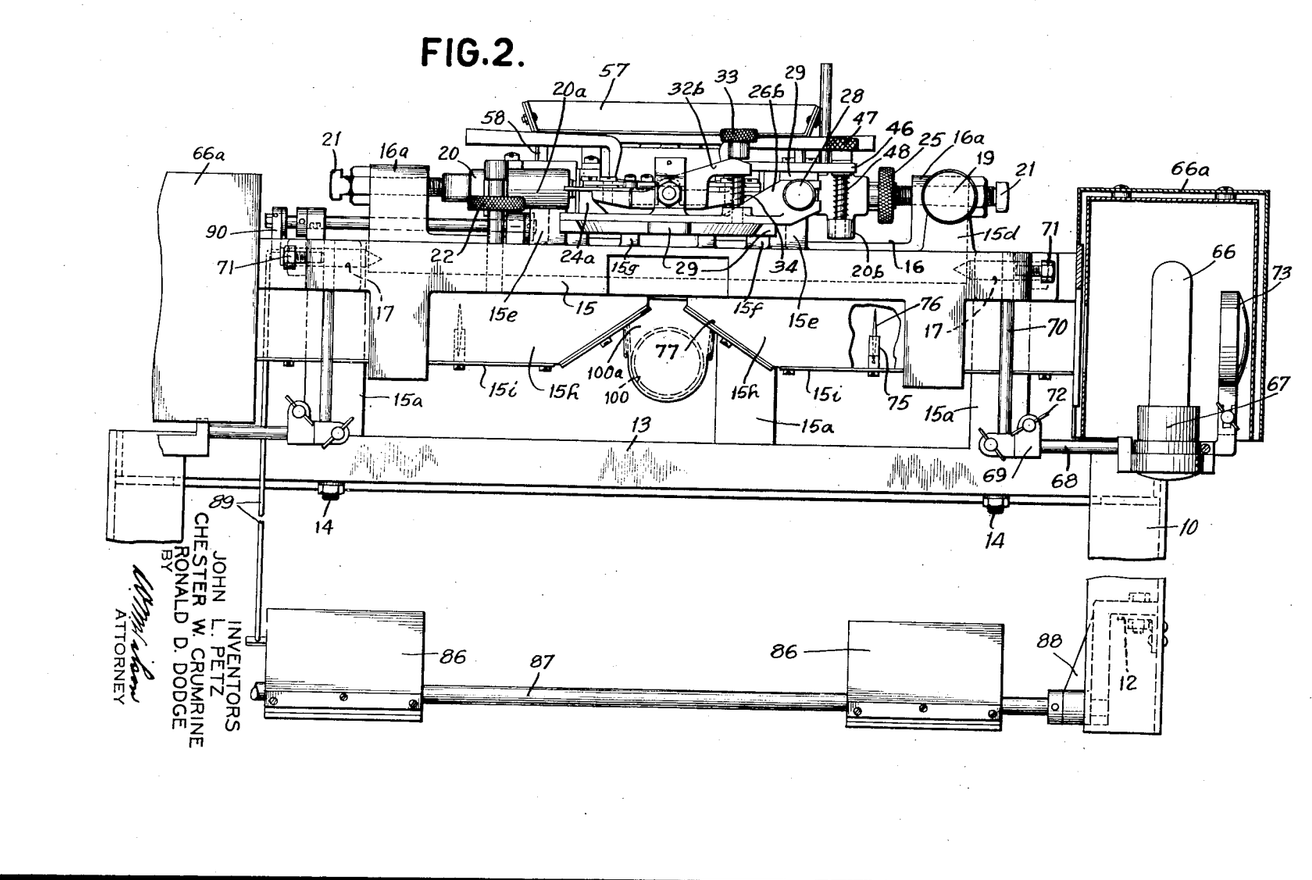
Fig. 2 is a front elevation with the light box removed.
Figures 3, 7, 8:
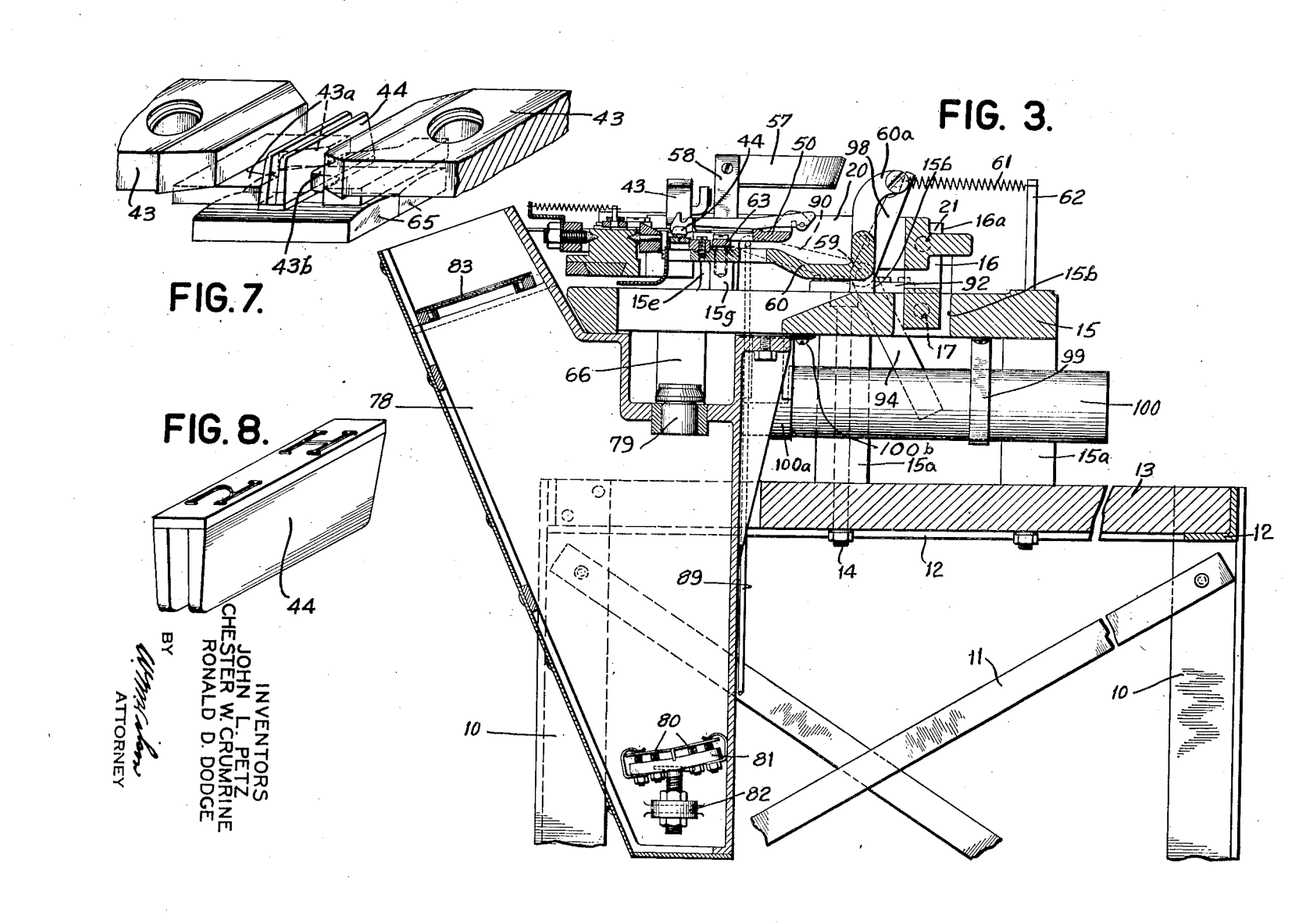
Fig. 3 is a vertical section on the line 3—3 in Fig. 1.
Fig. 7 is a large scale perspective view of a type element between the jaws of the clamping means.
Fig. 8 is a large scale perspective view of a type element.
Figure 5:
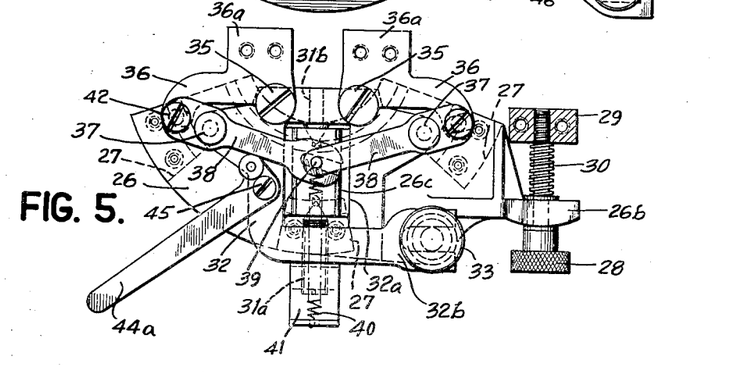
Fig. 5 is a large scale plan view of the parts which have been removed in Fig. 4.
Figure 6:
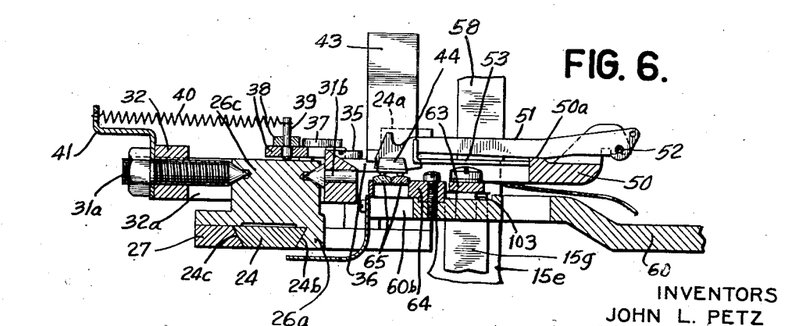
Fig. 6 is a vertical section showing certain parts appearing in Fig. 3 on a larger scale.

As shown in Figs. 3 and 6, the arcuate portion of frame casting 24 has the shape of an inverted trapezoid in vertical section and is semi-circular in plan view, the conical seats for the plunger 23 and stud 25 being formed in upstanding lugs 24a at the ends of the semi-circular trapezoidal portion whereby the latter portion is in a plane below the level of a horizontal plane passing through the axis of plunger 23 and stud 25. The frame casting 24 serves as a track for slidably mounting a casting 26 having an undercut portion 26a engaging the conical face 24b on the rear edge of the casting 24. Secured to the underside of the casting 26 are three equally spaced blocks 27 having conical faces (Figs. 2, 3, 5 and 6) engaging the outer conical surfaces 24b of the edge of frame casting 24. The frame casting 26 is thus slidably mounted upon the casting 24 so as to travel in semi-circular path.

The casting 26 is formed with a slotted lug 26b (Figs. 1, 2 and 5) which embraces the shank of a thumb screw 28 screwed into a threaded hole in a block 46a which is secured to a relatively fixed part which will be described later. Interposed between the lug 46a and the lug 26b is a coil spring 30 which constantly presses lug 26b against the thumb piece of the thumb screw 28. Assuming that the block 28 remains relatively fixed in space, it is evident that rotation of the thumb screw 28 will cause the casting 26 to move in one direction or the other along the arcuate track formed in the casting 24, these movements being clockwise or counterclockwise, respectively, relative to Figs. 1, 4 and 5.

The casting 26 is formed with an upstanding lug 26c (Figs. 5 and 6) having conical seats for conically pointed studs 31a, 31b received in aligned holes in a casting 32, said lug 26c projecting upwardly through a rectangular opening 32a in the casting 32. Stud 31a is threaded while stud 31b is merely pressed into its hole. The frame 32 is thus rockably mounted upon the lug 26b the axis of rotation being horizontal and extending fore and aft with reference to Figs. 1 and 5.

The frame casting 32 is formed with a short slotted arm 32b (Figs. 1, 2 and 5) which embraces the shank of a thumb screw 33 which is screwed into a vertical threaded hole in the casting 26, a spring 34 (Fig. 2) being interposed between the lug 32b and the casting 26 so as to normally urge the lug 32 up against the thumb piece of thumb screw 33. It is plain that, by rotating the thumb screw 33 in one direction or the other, the frame 32 may be adjustably rocked on its pivots 31a, 31b.

Figure 1:
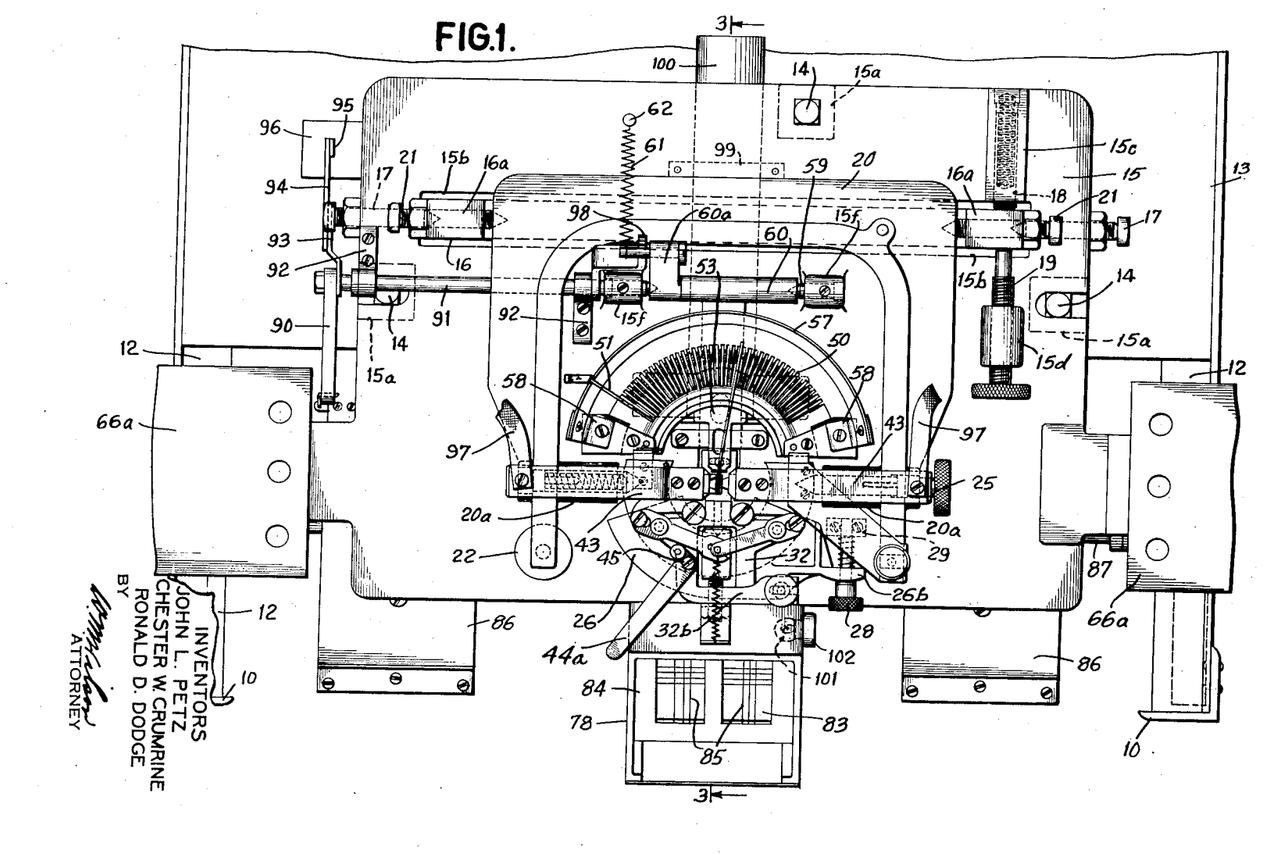
Fig. 1 is a plan view of the machine.

Pivotally mounted on the top of frame 32 by means of screw studs 35 are two levers 36 (Figs. 1, 5 and 6). Also pivotally mounted on headed studs 37 on the top surface of the casting 32 are two levers 38 which are interconnected at 39 by a pin and slot connection, the pin 39 being secured in the longer arm of one of the levers 38 and extending into a slot formed in the longer arm of the other lever. A spring 40 attached to the pin 39 and to a bracket 41 secured to the front edge of the casting 32 the lock nut for stud 31, normally tends to draw the longer arms of the levers 38 forwardly. The shorter arms of the levers 38 are slotted to embrace studs 42 in the ends of the levers 36. The tension of the spring 40 applied to the pin 39 thus constantly tends to move the rearwardly extending arms 36a of levers 36 toward each other. Secured to the top sides of the arms 36a are electrodes 43 which also serve as the jaws of a clamp between which may be placed the type element to be soldered to the type bar. For this purpose, the left hand electrode 43 has two lugs 43a which cooperate with a single lug 43b formed in the right hand electrode to grip the sides of the type element to be soldered.

Figure 4:
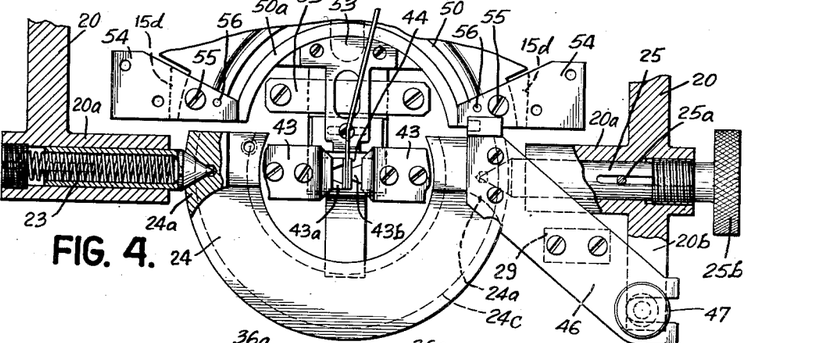
Fig. 4 is a large scale detail plan view with certain parts removed.

One of these type elements, designated 44 in Figs. 4, 6, 7 and 8, is placed between the jaws formed by the lugs 43a, 43b as illustrated in Figs. 4 and 7 so that the lugs 43a engage the type element near the ends of the thicker portion, while the lug 43b engages the middle of the type. The electrodes 43 are connected to a suitable transformer whereby electric current may be caused to flow through the type element for the purpose of heating it sufficiently to melt solder. For this purpose, the electrodes 43 are insulatably mounted upon the levers 36 and, owing to the location of the lugs 43a, 43b, the current is caused to flow lengthwise of the types rather than transversely. This causes a more uniform heating of the type element and at the same time reduces the amount of current necessary to heat it as the type element has an area smaller in transverse cross section than in longitudinal cross section.

For the purpose of inserting a type element between electrode 43, there is provided a lever 44a (Figs. 1 and 5) pivoted on a stud 45 screwed into a threaded hole in the casting 32. The shorter arm of the lever 44a has a roller engaging the front edge of one of the levers 38. By rotating the lever 44a in a clockwise direction (Figs. 1 and 5), the rearwardly extending arms 36a of the lever 36 will be caused to move apart thereby separating the electrodes 43 sufficiently to place a type element therebetween.

When the lever is released, the spring 40 will cause the electrodes 43 to move toward each other and lightly clamp the type element 44 in position as illustrated by Figs. 4, 6 and 7.

The frame 24 and the parts supported thereby may be adjustably rocked on plunger 23 and stud 25 as a pivot and for this purpose there is secured to the right hand lug 24a of the frame 24 an arm 46 (Figs. 1, 2 and 4) having a slot embracing the shank of a thumb screw 47 screwed into a threaded hole in an extension 20b of the right hand arm of the frame 20. A spring 48 (Fig. 2) is interposed between said arm and the extension 20b so as to press the arm 46 upwardly against the thumb piece of the thumb screw 47. By rotating the thumb screw 47 in the proper direction the frame casting 24 and all the parts supported thereby may be adjustably rocked on plunger 23 and thumb screw 25 of its pivot. The block 46a mentioned above is secured to the underside of the arm 46.

The thumb screws 19, 22 and 25 make it possible to adjustably move a type element 44 between the jaws 43 linearly or substantially linearly in three directions, that is, fore and aft, to right or left, and vertically with reference to Fig. 1. The thumb screws 28, 33 and 47 provide a means whereby a type element between the electrodes 43 may be rotated in three intersecting planes with axes of rotation intersecting near the center of the type element. It is thus evident that the position of the type element may be very accurately determined and its angular, longitudinal, and transverse relations to a type bar controlled.

As a preliminary to soldering the types to the type bars, an assembled segment generally designated 50 in Figs. 1, 3 and 6, is placed in the machine in the space directly in the rear of the mechanism for rotating the type element and between the arms of the frame 20. The segment as shown in the drawing is of a form well known in the typewriter art consisting of a semi-circular casting slotted along its outer curved edge to pivotally support and guide the type bars 51 by means of a wire 52 (Fig. 6). For sake of clearness all but two of the type bars have been shown broken away in Fig. 1. The segment assembly also includes the usual type bar guide 53 (Figs. 1, 4 and 6) which is secured to the front face, that is, the top face in Figs. 1, 4 and 6, of the segment. The type guide 53 is herein used for the purpose of holding the type bars in alignment for the soldering operation, the object being to manipulate the type by means of the various thumb screws until the relation between the type element and its type bar is the same as it should be in the finished typewriter to produce the proper alignment of the printed characters. As clearly shown in Figs. 4 and 6, the type guide 53 is bifurcated in a manner well known in the typewriter art to slidably engage the sides of the type bar near the type element 44.

For the purpose of mounting the assembled segment in the machine for the soldering and aligning operation the base casting 15 is formed with two posts 15d (Fig. 4) located directly behind the bosses 20a on the frame 20 which posts 15d support blocks 54 which extend horizontally above the top of the casting 15 toward each other. The blocks 54 are spaced to correspond with parts of the typewriter framework on which the assembled segment 50 is mounted and the segment is secured to these blocks by means of screws 55 and dowel pins 56 in the same general way as in the typewriter.

For the purpose of supporting the type bars when the segment is in place, there is provided an arcuate support strip 57 (Figs. 1, 2 and 3) which is mounted on brackets 58 secured to the top surface of the blocks 54. When the segment is placed in the soldering machine, the type bars 51 are allowed to swing backwardly and recline against the inner inclined face of the arcuate strip 57 as shown at the left in Fig. 1 by means of a type bar which has a type element soldered thereon.

Optical means are provided for indicating when a type element has been properly positioned relative to its type bar for arcuate alignment and is in readiness for the soldering operation. This means consists of a system of light sources, lenses, and mirrors whereby images of the type faces are cast upon a screen provided with index lines to enable the operator of a machine to accurately position the type by aligning the images of the type with certain of the index lines.

Pivoted on conically pointed studs 59 (Figs. 1 and 3) loosely received in horizontally aligned holes in lugs 15f formed in the top surface of the casting 15 is an arm 60 which extends forwardly in Fig. 1, or to the left in Fig. 3, to a point just below and between the jaws of the electrodes 43. Integral with the arm 60 is a short arm 60a connected by a spring 61 to a post 62 pressed into a hole in casting 15 whereby spring 61 has a tendency to rock said arm 60 in a clockwise direction (Fig. 3) so as to engage said arm with a stop bar 63 secured to posts 15g formed integral with casting 15. The forward end of the arm 60 is slotted or forked at 60b and secured to the upper side of the forward end of said lever above the slot 60b is a lens holder 64 in which is mounted a pair of cylindrical lenses 65 laid side by side with their axes of cylindricity parallel so as to span the slot 60b.

At this point, it is desired to explain that the characters formed on the types 44 are curved to conform to the radius of the platen of the typewriting machine, therefore, the convex portions of the lenses 65 have the same radius as the platen. The object of the adjustments provided by the various thumb screws described above is to so manipulate the type elements while they are between the electrodes 43 that said types bear evenly on the convex surfaces of lenses 65 whereby the surfaces of both of the lenses conform closely to the corresponding cylindrical faces of the type characters. When type characters of a given type element bear evenly on both of the lenses 65 and have been properly aligned laterally of the end of the type bar, that is, longitudinally of the lenses, the type element is in readiness for the soldering operation. The lenses thus act as a gauging means to determine the vertical alignment, the horizontal alignment, and the evenness with which the type characters eventually will press against the platen of the typewriting machine. The lateral alignment or centering of the characters is purely a matter of shifting the type element parallel with the longitudinal axes of the lenses by means of the thumb screw 25b.

With reference to Figs. 1 and 2, there is provided a suitable light source on each side of the machine. The light sources may take the form of incandescent lamps like the lamp 66 which may be of a type commonly used in motion picture machines and other projection apparatus. The lamps 66, as illustrated in Fig. 2 at the right, are mounted in sockets 67 which in turn are mounted on rods 68, and are shielded by double walled covers 66a. The rods 68 are slidably mounted in a block 69 which in turn are slidably mounted in vertically extending rods 70 secured in holes in casting 15 by means of set screws 71. Clamp screws 72 in the blocks 69 provide a means whereby the light source 66 may be adjusted horizontally or vertically, the blocks 69 being split in a well known way whereby the blocks 69 may be moved vertically on rods 70 and the rods 69 may be moved horizontally for the purpose of bringing the lamps 66 into focus. Also mounted on each of the rods 68 in a mirror 73 which is designed to reflect the light from source 66 horizontally toward the center of the machine.

Parallel ribs 15h formed in the casting 15 together with cover plates 15i comprise a pair of light chutes. The light chutes are in longitudinal alignment and extend from a point near the center of the machine and beneath the lenses 65 to points close to the light sources 66. Mounted inside of each light chute on the associated cover plate 15i is a lens holder 75 supporting a lens 76 which focuses the light from each light source 66 on a mirror 77 secured to ribs 15h at the inner end of the light chute. By the cooperation of the mirrors 73, the lenses 76 and mirrors 77 beams of light are projected horizontally and deflected upwardly through the lenses 65 onto the faces of the type characters of a type element clamped between the electrodes 43.

Secured to the underside of the casting 15 is a viewing box 78 best shown in Fig. 3. The viewing box, at point directly underneath lenses 65, is provided with a lens assembly 79 designed to focus the images of the type faces as illuminated by the light sources 66, upon mirrors 80 adjustably mounted in an adjustable mirror mounting 81 carried by a lug 82 forming part of the lower end of the viewing box 78 on the inside. There is provided a separate mirror 80 for each lens 65 and the angles of mounting of the mirrors 80 are such that images of the faces of the type element will be reflected upon a ground glass screen 83 mounted inside of the viewing box near the open end thereof. As shown in Fig. 1, the ground glass screen 83 is provided with a mask 84 having two openings, one for each image and the screen is provided with suitable index lines 85 which may be either engraved upon the surface of the glass or may consist of separate wires or cross hairs mounted on the surface of the screen.

The left hand group of index lines 85 in Fig. 1 is used for aligning the upper case characters while the right hand index lines are used for the lower case characters. When the machine has been operated in the manner hereinafter to be described, an image of the upper case character will appear in a certain relation to the left hand group of index lines while an image of the lower case character will similarly appear in proper relation to the left hand group of index lines. When the images have been properly aligned with the index lines, current is caused to flow through the electrodes 43 and type element 44 therebetween, also the arms 60 carrying the cylindrical lens 65 is caused to rock downwardly or counterclockwise in Fig. 3 to remove the lenses 65 from contact with the contact element to avoid damaging the lenses as a consequence of the heat generated in the type element by the flow of current.

These two operations are performed simultaneously by means of a treadle system which includes a pair of pedals 86 (Figs. 1 and 2) secured to a rod 87 journaled in brackets 88 secured to the lower side members 12 of the framework. The left hand pedal 86 is connected by a rod 89 to an arm 90 (see Fig. 3) secured on the right hand end of a shaft 91 journaled in bearings 92 fixed to the top surface of the casting 15. The shaft 91 is in longitudinal alignment with studs 59 on which the arms 60 is pivotally mounted. Secured to the left hand end of the shaft 91 is an arm 93 connected by a link 94 to the switch arm 95 of a switch 96 secured to the side of the casting 15.

When the pedals 86 are pushed downwardly, the shaft 91 rocks in a counterclockwise direction (Fig. 3) and thereby operates the switch 96 causing it to close and turn on the current to a suitable transformer of a type commonly used for spot welders and other apparatus for locally heating by means of electric current. This transformer is not shown in the drawings as it does not by itself form part of the invention. It is mounted on the rear end of the main framework comprising the members 10 to 13 and is connected to the electrodes 43 by means of suitable flexible metallic straps 97.

On the right hand end of shaft 91 (Figs. 1 and 3) is secured an arm 98 which extends upwardly behind the pin on arm 60 to which the spring 61 is anchored. When the pedals are operated to close the switch 96, the arm 98 swings forwardly in Fig. 1 or clockwise in Fig. 3, thereby rocking the arm 60 in a counterclockwise direction in Fig. 3 to remove the lenses 65 from contact with the type element.

In order to prevent fumes produced by the soldering operation from rising into the operator's face, there is suspended from the underside of the casting 15, by means of a suitable strip 99, a tube 100 which at its rear or right hand end (Fig. 3) may be connected to a suitable exhaust fan. The front end of the tube 100 has secured thereto (Figs. 2 and 3) a funnel or register box 100a which is open at the top to admit the fumes which are drawn downwardly by the fan. The funnel or register box 100a is formed of sheet metal and is secured to the underside of casting 15 by means of screws 100b (Fig. 3).

It is desirable that provisions be made for protecting the lenses 65 against damage due to applying too much pressure thereon in rocking or moving linearly the type element which is to be aligned. Accordingly, an electrically controlled signal means is provided which is designed to warn the operator when excessive pressure, or in fact, more then a slight pressure is being applied to the lenses by the type element. The signal means includes an electric incandescent lamp 101 (Fig. 1) mounted in a socket 102 secured to the side of the viewing box 78. The light 101 is located inside the viewing box in such a relation to the screens 83 that, when the light is illuminated, the screens will be uniformly illuminated thereby obliterating the images of type faces. For the purpose of controlling the light 101, a contact 103 (Fig. 6) is mounted on the arm 60 underneath the bar 63 and normally contact 103 engages the underside of said bar 63. The latter is insulated from the post 15g on which it is mounted by means of thin pieces of insulating material such as fibre or "Bakelite." The lamp 101 may be connected to a suitable tap on the transformer while the contact 103 and bar 63 normally hold closed a shunt circuit including a resistance around the lamp 101 whereby the lamp does not receive sufficient current to illuminate it. However, if a slight pressure is exerted on the faces of the lenses 65 tending to move the arm 60 downwardly, the shunt circuit is broken and sufficient current flows through the lamp and causes it to become brightly illuminated thereby obliterating the image on the screen.

The operation of the soldering and aligning machine will now be described.

It will be understood that alongside of the machine and within convenient reach of the operator of the machine, is a suitable tray provided with compartments for the different type elements. An assembled segment having the type bars and the type guide 53 will be secured to the blocks 54 as described. The unsoldered type bars will be allowed to lean against the curved support 57 and one of them will be swung forwardly and allowed to rest on the anvil 50a (Figs. 4 and 6) which in the typewriting machine acts as a stop for the type bars when propelled to the printing point. The position occupied by the type bar 51 is clearly shown in Fig. 6. Before swinging the selected type bar forwardly, the proper type element 44 is selected from the tray and placed between the jaws of the electrodes 43, the operator first placing a drop or two of a black fluid or light paste on the faces of the lenses 65. When the selected type bar is swung forwardly and allowed to rest on the anvil 50a, between the cam surfaces formed in the type guide, the free end of the type bar will extend into the slot in the type element 44. The thumb screws 19, 22, 25, 28, 33 and 47 are now manipulated the extents necessary to rock the type element 44 in the desired direction or move it linearly as may be required. Owing to the pressure of the type element on the cylindrical faces of the lenses 65, the faces of the types tend to press through the film of black fluid on the lenses whereby images are produced on screen 83 which resemble a photographic negative with the type faces of the type element appearing as white lines against a black background. This effect is due to the fact that the black fluid does not reflect or transmit light whereas the polished faces of the type elements are light reflective.

The ideal condition is reached when the type faces bear evenly on the lenses 65 whereby the high lights produced by the reflection of light from the type faces appear on the screen as white lines of uniform thickness and the characters are properly centered with respect to the index lines 85. When the images of both type faces have become properly aligned with respect to both the horizontal and vertical index lines, the operator places a few drops of soldering fluid on each side of the type bar above the slot formed in the type element 44 so as to permit the soldering fluid to run down into the cracks between the type element and the type bar. The pedals 86 are then pushed down by the operator's feet thereby turning on the current to the transformer and removing the lenses 65 from contact with the type element. When the type element and the end of the type bar have become sufficiently heated due to the passage of the current through the type element, the end of a soldering wire is held against the type bar above the crack between the type bar and type element on one side of the type bar, and held there long enough for a small amount of the solder to melt and run down into the spaces between the type element and the type bar, completely filling said spaces. The pedals are then released, and, after the solder has hardened sufficiently, the soldered type bar is swung upwardly and allowed to recline against the support strip 57. This process is repeated until all of the type elements have been soldered.

If it should happen that the operator rotates one of the thumb screws too much whereby the type element presses downwardly on the cylindrical faces of the lenses 65 thereby tending to move the arm 80 downwardly, the light 101 inside of the viewing box will become light as described and by illuminating the screen 83 uniformly will block out the images of the type faces and warn the operator that too much pressure is being applied to the lenses such as to tend to damage them.

The principal advantage of the soldering machine described herein is that the aligning and soldering operations are performed in a single machine and without the use of tools, thereby effecting a considerable saving in time. Since the type elements are brought into exactly the same relation to their respective type bars as they will ultimately have when printing upon a work sheet on the platen of the type-writer in which they will be used, the alignment of the printed characters is superior to the alignment obtained by prior aligning and soldering machines and methods. Another advantage of the machine is that it is relatively very simple to use and requires a minimum of manual operations to effect the soldering and aligning of the type bar whereby production may be increased without corresponding increase in labor cost.

Since a high degree of skill is not required to effect the aligning and soldering operation, it is not necessary to employ highly skilled labor for these operations thereby effecting a further saving in the labor costs. Heretofore in the art, the operations of aligning and soldering the type elements have been delicate operations effected in several steps with many tools and machines and required the employment of much skilled labor. The results obtained by prior methods and means were extremely variable even when highly skilled workmen were employed. The invention described herein reduces the number of steps in the soldering and aligning operations and makes it possible to perform both of these operations on a single machine without special tools.

Other advantages will readily be seen by those skilled in the art of constructing typewriting machines.

While there has been shown and described and pointed out the fundamental novel features of the invention as applied to a single embodiment it will be understood that various omissions and substitutions and changes in the form and details of the device illustrated and in its operation may be made by those skilled in the art without departing from the spirit of the invention. It is the intention, therefore to be limited only as indicated by the scope of the following claims.

What is claimed is as follows:

1. In a machine of the class described, the combination of a support for a type bar, a support for a type element provided with one or more characters having curved faces to conform to the platen of a typewriting machine, a gauging device having curved surfaces conforming to the curved faces of the type characters, said gauging device being transparent to permit a view to be had of the contact of the type faces with the curved surfaces, means to universally mount the second-named support for linear movement in three intersecting planes and for rotational movement in three intersecting planes, and an optical device cooperating with the transparent gauging member for observing when the curved type faces conform at every point to the curved surfaces.

2. In a machine of the class described, the combination of a support for a type bar, means to movably mount a type element to be secured to the type bar, means to adjustably move the mounting means whereby to locate the type element in a predetermined position with respect to the type bar, and optical means to visually indicate when the type element is in the predetermined position, said optical means comprising a screen having index marks denoting the proper position of the type element, a light source for illuminating the faces of the characters on the type element, and a transparent member having a coating of opaque material through which the faces of the characters on the type element project, said characters, when the type element is properly positioned in relation to its type bar, projecting through said opaque material so as to be illuminated by the light source and thereby enable an image of the faces of the characters to be projected upon the screen, said moving means being operable to move the type element in any direction necessary to produce a uniform image and an image that is properly centered with respect to the index marks on the screen.

3. In a machine of the class described, the combination of a pair of supports, one for the type bar and one for a type element to be secured to the type bar, a gauging element, a support therefor, means to cause a relative movement between the support for the type element and the other two supports in a plurality of directions linearly and a plurality of directions of rotation whereby said type element may be brought into a predetermined position in relation to its type bar determined by contact of the type element with said gauging element, and means to visually indicate when the type element is in the predetermined position.

4. In a machine of the class described, the combination of a support for a type bar, a pair of jaws for gripping a type element having characters formed thereon, means to slidably and pivotally mount said jaws for a plurality of linear movements at right angles to each other and a plurality of rotational movements in planes at right angles to each other, a gauging member having gauging surfaces coacting with the faces of type characters, means for pivotally mounting said gauging member, means for holding the gauging member in a predetermined position in relation to the type bar, and means responsive to movement of the gauging means and operative, when the type element is moved an excessive amount in a predetermined direction such as tends to move the gauging member out of its predetermined position, to warn the operator that the type element has been moved an excessive extent.

5. In a machine of the class described; a support for a type element having characters formed thereon, said support including a pair of jaws for gripping the type element, said jaws also acting as electrodes by means of which a current of electricity may be passed through said type element to heat same, means to close a circuit through said jaws and said type element; a support for a member to which said type element is to be secured; gauging means for determining a predetermined position of said type element in relation to said member including a transparent gauging element adapted to contact with the faces of the type characters on said element when between said jaws, said type element, when in its proper relation to said member, having the characters thereon evenly contacting with the surface of the gauging element; means for illuminating the faces of the type characters through said transparent gauging element, a screen having gauging marks thereon which by cooperation with the image of the faces of the type characters denotes the proper position of the type element in relation to the member to which said element is to be sensed, and a system of lenses for projecting an image of the type faces upon said screen; means to movably mount said gauging element to permit said element to be moved out of contact with the type characters and to a position remote from the effects of heat produced in the type element by the flow of current, and means operative when the circuit closing means is operated to actuate the support for the gauging element to move said element out of the heat zone to prevent damage thereto while heating the type element.

6. In a machine of the class described, a base member, a type bar support secured to said base member, a pair of movable jaws between which the type element may be placed, means to adjustably movably mount said jaws on the base member whereby the type element therebetween may be moved in a plurality of directions in relation to the type bar; and optical means comprising a screen, a light source, and a system of lenses and mirrors for projecting on said screen an enlarged image of the faces of the type characters on said type element, said screen being provided with a plurality of index lines whereby, by manipulation of the adjusting means and observing the relation of the image to said lines, the type element may be brought to a predetermined relation with the type bar.

7. In a machine of the class described, the combination of a support for a type bar, a support for a type element having type characters thereon, means to universally adjustably mount the support for the type element to permit said type element to be moved in any direction to bring it into a predetermined relation with the type bar, and means to project an enlarged image of the faces of the type characters upon a screen whereby the relation of the type element to the type bar may be studied while the type element is being moved with respect to the type bar.

8. In a machine of the class described, the combination of a base member, a type bar support mounted on said base member; a support for the type element to be secured to said type bar, including a pair of jaws between which the type element may be gripped; means to mount said support for adjustably moving the latter linearly in three directions and further adjustable means for rockably mounting said support for adjustably rocking said support in three intersecting planes, and alignment indicating means including an element engaging and movable by the type element.

9. In a machine of the class described, the combination of a support for a type bar, a support for a type element, said second-named support including a pair of jaws between which the type element may be clamped, a pivoted lens mount, a cylindrical lens supported by said mount upon which the type element is placed prior to engaging the jaws therewith, an optical system including said cylindrical lens; a light source, and a screen having index lines for projecting an enlarged image of the type upon the screen; means to adjustably move the type element in relation to said lens until said type element becomes evenly seated thereon, said type element when evenly seated upon said lens through said optical system producing an image upon said screen in a predetermined relation to the index lines, means for causing a flow of current through said jaws to said type element when said predetermined relation is obtained, and means for moving the cylindrical lens away from the type element while the type element is being heated by the passage of the current.

10. In a machine of the class described, the combination of a pair of supports, one of said supports having a pair of jaws for a type element and means to operate the jaws to grip the type element and release same, the other support for a member to which the type element is to be ultimately secured, means to adjustably movably mount one of said supports whereby the type element and said member may be adjustably manipulated in any direction relatively to each other to obtain a predetermined relationship therebetween, and a projection device for projecting an image of the type faces, said device including a screen having index marks for indicating upon the screen when the predetermined relation exists.

11. In a machine of the class described, the combination of a support for a type element, means for adjustably moving the type element to a predetermined position, an optical system including a lens in contact with said type element and a screen upon which an image of the face of the type element is projected, and means for obliterating the image of the type element on a screen when the positioning of the type element in its support tends to move the lens.

12. In a machine of the class described, the combination of cylindrical lens, a type element having a type face curved in conformity with the cylindricity of the lens, means to adjustably move the type element to bring every portion of the curved type face into intimate contact with the cylindrical surface of the lens, an optical system including said lens for projecting an image of the curved type face upon a screen, said screen being provided with means to denote a predetermined condition of adjustment of the type element in cooperation with the image, and means controlled by the movement of the type element to cancel said image when the type element is moved to an extent likely to damage the lens.

13. In a machine of the class described, the combination of a support for a type element having characters formed thereon, means to project images of the faces of the characters on the type element upon an image surface provided with index lines in a predetermined relation to which the images of the type faces are to be placed, means to adjustably move the support for the type element to bring said images of the type faces into the predetermined relationship with said index lines or cross wires, and a gauging element cooperating with the faces of the characters for defining the predetermined relationship.

14. In a machine of the class described, a support for a type bar, a support for a type element, means to adjustably move one of said supports relative to the other to bring the type element into a predetermined relationship with the type bar, said adjustable means including a plurality of manipulative devices for producing both a plurality of rotational movement of the support and a plurality of linear movements of the support, and indicating means including an element contacting with said type element for denoting when the predetermined relationship is attained.

15. In a machine of the class described, a support for a type bar, a support for a type element, means to adjustably move one of said supports relative to the other to bring the type element into a predetermined relationship with the type bar, said adjustable means including a plurality of selectivity operable manipulative devices for producing a plurality of rotational movements of the support and a plurality of linear movements of the support, an indicating means for denoting when the predetermined relationship is attained, and means responsive to movement of the type element while it is being adjusted for indicating that the type element has been moved an excessive extent in a predetermined direction.

16. In a machine of the class described; a support for a type element having type characters formed thereon, said support including releasable means to rigidly hold the type element on its support; a support for a member to which the type element is to be secured in a predetermined relationship, a gauging member adapted to cooperate with the faces of the characters to define the predetermined relationship, means to movably mount the gauging member, means including a stop coacting with the mounting means for holding the gauging member in its gauging position, means to mount the support for the type element for both linear and rotational movement in three planes intersecting at right angles whereby the type element may be manually moved in relation to the gauging member to bring the type element into the predetermined relationship to the element to which it is to be secured, and means to move the gauging member out of gauging position.

17. In a machine of the class described, a support for a type element having type characters formed thereon, a support for a member to which the type element must be secured in a predetermined position, a gauging element coactive with the faces of the characters on said type element to define the predetermined position, said gauging element being composed of relatively fragile material, manually selectively operable means to move said type element and gauging element relative to each other to bring the faces of the type characters into intimate contact with said gauging element and to center said type element with respect to the member to which the type element is secured, and means to mount said gauging element for yielding movement in the event the type element is moved in a direction to exert excessive pressure on the fragile gauging element.

18. In a machine of the class described, the combination of a support for a type element, a support for a member on which the type element is to be mounted, means to movably mount one of said supports, a plurality of manipulative devices for moving the movable support in a plurality of directions linearly and in a plurality of directions of rotation whereby to enable the type element to be brought into a predetermined relationship to the member on which it is to be mounted, and an optical device for examining the faces of the type characters on the type element while it is being moved, said optical device including a gauging member contacting with the faces of the characters and arranged to conform closely to the faces of the characters when said type element is in the predetermined relation to the member to which it is to be secured.

19. In a machine of the class described, the combination of a support for a type element, a support for the member on which the type element is to be mounted; an optical device for examining the faces of the characters on said type element, including a gauging element contacting with the faces of the characters and arranged to determine a predetermined relation between the type element and the member to which it is to be secured, and manipulative means for moving one of said supports relative to the other to bring the type element into the predetermined relation to the member to which it is to be secured.

20. In a machine of the class described, the combination of a pair of supports, one for a type element provided with at least one character, the other support for a member on which the type element is to be mounted; means to move one of said supports relative to the other in a plurality of directions both linearly and of rotation to bring the type element in a predetermined relation with the member in which relation said element and said member are to be secured together, gauging means cooperating with the face of the character and disposed so as to intimately contact with every portion of the face of the character when the type element is in the predetermined relation to said member, and means for determining when said gauging element and the face of the character are in proper contact.

21. In a machine of the class described, the combination of a plurality of supports, one for a type element having a character formed thereon, one support for a member on which the type element is to be mounted in a predetermined relation to said member, and one support for a gauging member adapted to contact the face of the character evenly when the predetermined relation exists between the type element and said member; means to move certain of said supports relative to each other to bring said element and said member into the predetermined relation, and means to indicate when the gauging member and the face of the type element are in even contact.

22. In a machine of the class described, the combination of a plurality of supports, one for a type element having a character thereon, one for a member on which the type element is to be mounted in a predetermined relation, and a third for a transparent gauging member having a face designed to contact evenly with the face of the character when the type element is in the predetermined relation to said member; means to move certain of said supports relative to each other to bring said type element into even contact with the transparent gauging member, and a projection device including an optical system of which said transparent gauging member forms a part for denoting visually when said element and said gauging member are in proper contact.

23. In a machine of the class described, the combination of a plurality of supports, one for a type element having a character thereon, another for a member on which the type element is to be mounted in a predetermined relation, and a third for a transparent gauging member having a face designed to contact evenly with the face of the character when the type element is in the predetermined relation to said member; means to move certain of said supports relative to each other to bring said type element into even contact with the transparent gauging member, and optical means of which said transparent gauging member forms a part for forming an enlarged image of the contact of the face of the type character with the gauging element for visually observing when said element and said face are in even contact.

JOHN L. PETZ.
CHESTER W. CRUMRINE.
RONALD D. DODGE.